A. Belt,
Hedge Fence.
No. 100,843.  Patented Mar. 15. 1870.
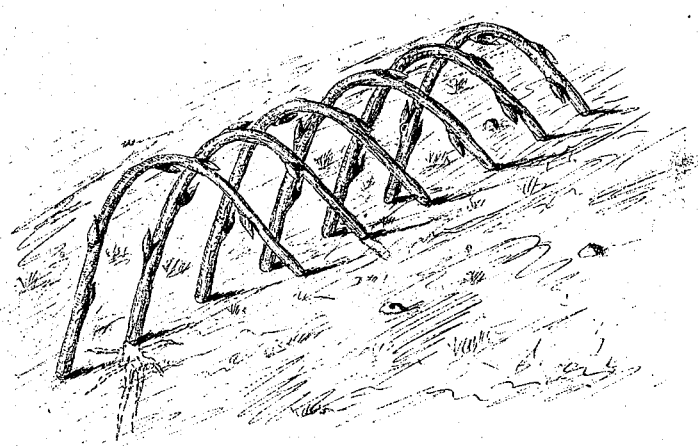
Witnesses  Inventor.

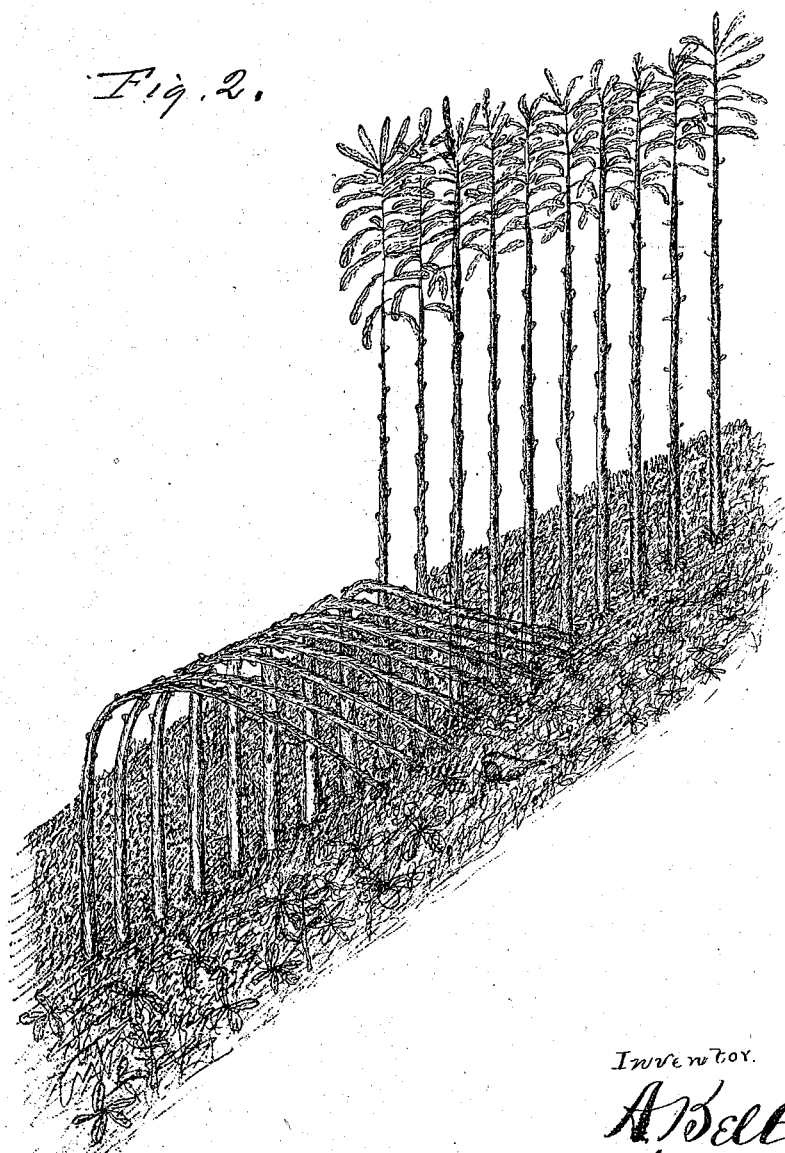

United States Patent Office.

A. BELT, OF NEWTON, IOWA.

Letters Patent No. 100,843, dated March 15, 1870.

IMPROVEMENT IN HEDGE FENCE.

The Schedule referred to in these Letters Patent and making part of the same.

*To all whom it may concern:*

Be it known that I, A. BELT, of Newton, Jasper county, Iowa, have invented certain new and useful Improvements in Hedge Fences; and do hereby declare that the following is a full, clear, and exact description thereof, reference being had to the accompanying drawings making a part of this specification, in which—

Figures 1 and 2 are views showing the fence as made.

My invention consists in forming a living hedge fence.

I use sprouts of willow, cottonwood, or other kindred material in the following manner:

I first prepare the earth by making a strip about eight feet wide, throwing the ground out, and making the central portion the deepest. I then harrow and manure the ground, and throw the earth back again with a plow. Within the bed thus made I place a series of slips or cuttings of willow or other material, in a row, a suitable distance from each other, and in the center of the bed. I then cover the bed with mulch, about three feet on each side. The plants are then allowed to grow about two years, and are kept trimmed during the while.

After the plants have attained a suitable height, I plow a furrow about one foot from and on a line with them, and bend the tops of the plants over in an oblique manner and insert them into the opposite furrow.

The plants thus bent are allowed to take root and grow, so that a fence is formed in lattice style, that is, about one foot at its base and an arch at its top, and the plant thus bent will grow upward from both ends, and in time become very compact and secure against the encroachments of stock.

In prairie countries, where wood is scarce, this fence will be found very economical, convenient, and beautiful.

Having thus fully described my invention,

What I claim is—

A hedge fence, formed by planting the sprouts into a bed formed therefor, and after the same has attained a suitable height, bending the tops over in an oblique manner and inserting the same into the earth into a bed formed about one foot from the first row, substantially as herein set forth.

In testimony that I claim the foregoing, I have hereunto set my hand this 20th day of September, 1869.

A. BELT.

Witnesses:
J. A. HAMMER,
J. F. WEAVER.